(12) United States Patent
Park et al.

(10) Patent No.: US 11,895,628 B2
(45) Date of Patent: Feb. 6, 2024

(54) METHOD AND DEVICE FOR ALLOCATING DATA CHANNEL RESOURCE FOR NEXT-GENERATION WIRELESS ACCESS NETWORK

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/970,604

(22) Filed: Oct. 21, 2022

(65) Prior Publication Data
US 2023/0056636 A1    Feb. 23, 2023

Related U.S. Application Data

(63) Continuation of application No. 17/170,922, filed on Feb. 9, 2021, now Pat. No. 11,540,272, which is a (Continued)

(30) Foreign Application Priority Data

Oct. 31, 2016 (KR) .......... 10-2016-0143013
Oct. 27, 2017 (KR) .......... 10-2017-0140898

(51) Int. Cl.
*H04W 72/044*    (2023.01)
*H04L 1/16*    (2023.01)
(Continued)

(52) U.S. Cl.
CPC ............. *H04W 72/044* (2013.01); *H04L 1/16* (2013.01); *H04L 1/18* (2013.01); *H04L 5/00* (2013.01);
(Continued)

(58) Field of Classification Search
CPC ... H04W 72/044; H04W 72/04; H04W 72/23; H04W 72/0446; H04L 1/16; H04L 1/18;
(Continued)

(56) References Cited

U.S. PATENT DOCUMENTS

2012/0287848 A1    11/2012  Kim et al.
2014/0105191 A1    4/2014   Yang et al.
(Continued)

FOREIGN PATENT DOCUMENTS

| CN | 102036386 | 4/2011 |
|---|---|---|
| KR | 10-2011-0088432 A | 8/2011 |
| KR | 10-2015-0060677 A | 6/2015 |

OTHER PUBLICATIONS

Chinese Office Action with English translation for Chinese Patent Application No. 201780066665.4, dated May 8, 2021.
(Continued)

*Primary Examiner* — Mang Hang Yeung
(74) *Attorney, Agent, or Firm* — Insight Law Group, PLLC; Seung Lee

(57) ABSTRACT

Provided is s a method for a base station to allocate a time interval resource to transceive a downlink data channel (PDSCH) or an uplink data channel (PUSCH). The method include allocating a time interval resource for each OFDM symbol on the basis of a slot or a mini-slot, transmitting, to a terminal, time interval resource configuration information including OFDM symbol allocation data for OFDM symbols used for data channel transception in the slot or the mini-slot, and transmitting, to the terminal, control information selecting one of the symbol allocation data included in the time interval resource configuration information.

20 Claims, 10 Drawing Sheets

Time-interval resource configuration information for a PDSCH (400)

```
{
{index 0, SOS 0, Length 4}
{index 1, SOS 0, Length 5}
        .
        .
        .
{index 15, SOS 5, Length 1}
}
```

Related U.S. Application Data continuation of application No. 16/346,108, filed as application No. PCT/KR2017/012105 on Oct. 30, 2017, now Pat. No. 10,952,206.

(51) Int. Cl.
  *H04L 1/18* (2023.01)
  *H04L 5/00* (2006.01)
  *H04W 72/04* (2023.01)
  *H04W 72/23* (2023.01)
  *H04L 1/12* (2006.01)

(52) U.S. Cl.
  CPC .......... *H04L 5/0007* (2013.01); *H04L 5/0037* (2013.01); *H04W 72/04* (2013.01); *H04W 72/23* (2023.01); *H04L 1/12* (2013.01)

(58) Field of Classification Search
  CPC ....... H04L 5/00; H04L 5/0007; H04L 5/0037; H04L 1/12; H04L 5/0053; H04L 5/0091; H04L 5/0094; H04L 5/0044; H04L 1/1614; H04L 1/1861; H04L 5/0078
  USPC ........................................................ 370/330
  See application file for complete search history.

(56) References Cited

U.S. PATENT DOCUMENTS

| | | |
|---|---|---|
| 2014/0348057 A1 | 11/2014 | Kim et al. |
| 2014/0376422 A1 | 12/2014 | Dai et al. |
| 2015/0016369 A1 | 1/2015 | Park et al. |
| 2015/0023265 A1 | 1/2015 | Park et al. |
| 2015/0029966 A1 | 1/2015 | Park et al. |
| 2015/0049625 A1* | 2/2015 | Kim .................... H04B 7/0619 370/252 |
| 2015/0173064 A1 | 6/2015 | Kim et al. |
| 2015/0180625 A1 | 6/2015 | Park et al. |
| 2015/0208392 A1 | 7/2015 | Park et al. |
| 2015/0215905 A1 | 7/2015 | Park et al. |
| 2015/0215906 A1 | 7/2015 | Park et al. |
| 2015/0223208 A1 | 8/2015 | Park et al. |
| 2015/0229451 A1 | 8/2015 | Park et al. |
| 2015/0236828 A1 | 8/2015 | Park et al. |
| 2015/0282126 A1 | 10/2015 | Park et al. |
| 2015/0289235 A1 | 10/2015 | Park et al. |
| 2016/0128037 A1 | 5/2016 | Park et al. |
| 2016/0150462 A1* | 5/2016 | Yang ................. H04W 74/0833 370/254 |
| 2016/0278055 A1 | 9/2016 | Park et al. |
| 2017/0006589 A1 | 1/2017 | Park et al. |
| 2017/0064678 A1 | 3/2017 | Park et al. |
| 2017/0078066 A1 | 3/2017 | Park et al. |
| 2017/0079018 A1 | 3/2017 | Park et al. |
| 2017/0195098 A1 | 7/2017 | Park et al. |
| 2017/0208569 A1 | 7/2017 | Park et al. |
| 2017/0208572 A1 | 7/2017 | Park et al. |
| 2017/0257853 A1 | 9/2017 | Park et al. |
| 2017/0257855 A1 | 9/2017 | Park et al. |
| 2017/0273061 A1 | 9/2017 | Park et al. |
| 2017/0303252 A1 | 10/2017 | Park et al. |
| 2017/0353282 A1 | 12/2017 | Park et al. |
| 2018/0070337 A1 | 3/2018 | Park et al. |
| 2018/0160409 A1 | 6/2018 | Park et al. |
| 2018/0227893 A1 | 8/2018 | Park et al. |
| 2019/0289605 A1 | 9/2019 | Futaki |
| 2020/0137751 A1* | 4/2020 | Nam ................... H04L 27/2602 |

OTHER PUBLICATIONS

Ntel Corporation, "On PUCCH coverage enhancement", R1-1609537, 3GPP TSG-RAN WG1 #86bis, Lisbon, Portugal, Oct. 10-14, 2016, pp. 1-5.

European Patent Office, European Search Report of corresponding EP Patent Application No. 17865576.7, dated Apr. 29, 2020.

Motorola Mobility, "Flexible frame structure and control signaling for NR", R1-1609919, 3GPP TSG RAN WG1 #86bis, Lisbon, Portugal, Oct. 10-14, 2016, pp. 1-4.

NTT DOCOMO, Inc., "Remaining details on PUSCH resource allocation and scheduling design for eLAA", R1-167343, 3GPP TSG RAN WG1 Meeting #86, Gothenburg, Sweden Aug. 22-26, 2016, pp. 1-5.

Ericssion, "Handling overlapping allocations with short and 1 ms TTI", R1-167503, 3GPP TSG-RAN WG1 #86, Goteborg, Sweden, Aug. 22-26, 2016, pp. 1-2.

* cited by examiner

FIG.4

Time-interval resource configuration information for a PDSCH (400)

{
{index 0, SOS 0, Length 4}
{index 1, SOS 0, Length 5}
.
.
.
{index 15, SOS 5, Length 1}
}

FIG. 6

Time-interval resource configuration information for a PUSCH (600)

{
{index 0, SOS 0, Length 4}
{index 1, SOS 0, Length 5}
.
.
.
{index 15, SOS 5, Length 1}
}

METHOD AND DEVICE FOR ALLOCATING DATA CHANNEL RESOURCE FOR NEXT-GENERATION WIRELESS ACCESS NETWORK

CROSS-REFERENCE TO RELATED APPLICATIONS

This application is a continuation of U.S. application Ser. No. 17/170,922, filed on Feb. 9, 2021, which is a continuation of U.S. application Ser. No. 16/346,108, filed on Apr. 29, 2019, which is a National Stage Patent Application of PCT International Patent Application No. PCT/KR2017/012105, filed on Oct. 30, 2017 under 35 U.S.C. § 371, which claims priorities to Korean Patent Application Nos. 10-2016-0143013, filed on Oct. 31, 2016 and 10-2017-0140898, filed on Oct. 27, 2017, the teachings of which are incorporated herein in their entireties by reference.

TECHNICAL FIELD

The present disclosure relates to methods and devices for allocating a data channel resource for a next-generation/5G radio access network (hereinafter, referred to as a new radio (NR)).

BACKGROUND ART

Recently, the 3GPP has approved the "Study on New Radio Access Technology", which is a study item for research on next-generation/5G radio access technology. On the basis of the Study on New Radio Access Technology, Radio Access Network Working Group 1 (RAN WG1) has been discussing frame structures, channel coding and modulation, waveforms, multiple access methods, and the like for the new radio (NR). It is required to design the NR not only to provide an improved data transmission rate as compared with the long term evolution (LTE)/LTE-Advanced, but also to meet various requirements in detailed and specific usage scenarios.

In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

In the typical LTE/LTE-A system, the allocation of an uplink/downlink data resource has been performed on a resource block (RB) basis in the frequency axis and on a subframe basis in the time axis.

Thus, in a downlink subframe, a UE receives downlink data through all OFDM symbols except for a control region for PDCCH transmission. In an uplink subframe, the UE transmits uplink data through all SC-FDMA symbols of the uplink subframe, or all SC-FDMA symbols except for the last symbol in case a SRS is configured.

In this regard, in the NR, discussions have been conducted for allocating a time-domain resource as well as a frequency resource as a scheduling resource for an uplink/downlink data channel.

SUMMARY OF DISCLOSURE

It is an object of the present disclosure to provide methods of a base station and a user equipment for allocating a time-domain resource for downlink data channel (PDSCH) or uplink data channel (PUSCH) transmission/reception in the next-generation/5G radio access network (NR).

In the NR, discussions have been in progress for frame structure, channel coding and modulation, waveform and multiple access schemes, or the like. It is required to design the NR not only to provide an improved data transmission rate as compared with the long term evolution (LTE)/LTE-Advanced, but also to meet various requirements in detailed and specific usage scenarios.

In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have flexible frame structures, compared with the LTE/LTE-Advanced.

In the typical LTE/LTE-A system, an uplink/downlink data resource is allocated on a resource block (RB) basis in the frequency axis and on a subframe basis in the time axis.

Thus, in a downlink subframe, a UE receives downlink data through all OFDM symbols except for a control region for PDCCH transmission. In an uplink subframe, the UE transmits uplink data through all SC-FDMA symbols of the uplink subframe, or all SC-FDMA symbols except for the last symbol in case a SRS is configured.

In this regard, in the NR, discussions have been conducted for allocating a time-domain resource as well as a frequency resource as a scheduling resource for an uplink/downlink data channel.

In accordance with embodiments of the present disclosure, in the NR, it is possible for a base station and a user equipment to transmit/receive a downlink data channel (PDSCH) or an uplink data channel (PUSCH) through methods of allocating a time-domain resource.

BRIEF DESCRIPTION OF THE DRAWINGS

FIG. 4 is a diagram illustrating an information sequence of UE-specific higher layer signaling including time-domain resource configuration information in a table form for downlink (DL) data channel (PDSCH) transmission/reception as in FIG. 3.

FIG. 6 is a diagram illustrating an information sequence of UE-specific higher layer signaling including time-domain resource configuration information in the form of a table for transmitting/receiving the UL data channel (PUSCH) as in FIG. 3.

DETAILED DESCRIPTION OF THE DISCLOSURE

Figure 1:
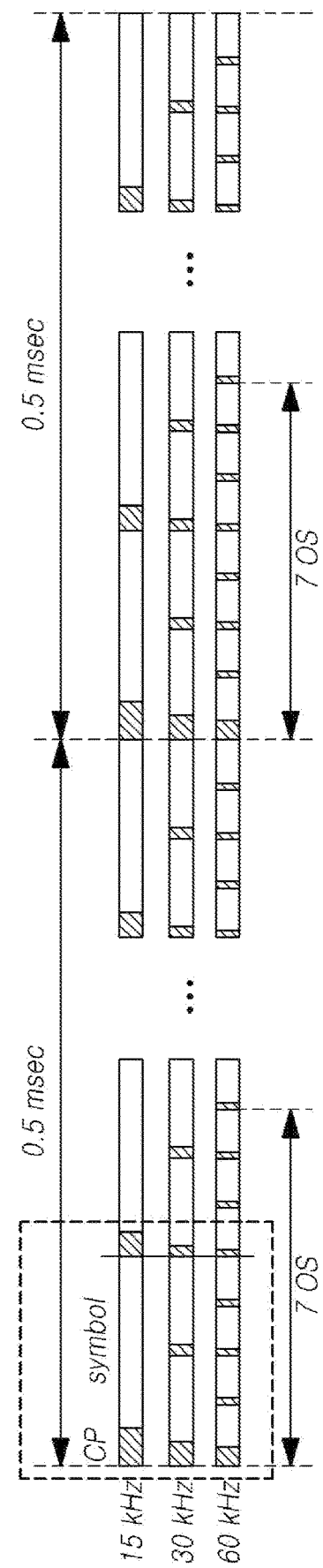
FIG. 1 is a diagram illustrating allocating a symbol-level resource for different SCSs.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In the present disclosure, an machine type communication (MTC) terminal may refer to a terminal supporting low cost (or low complexity), a terminal supporting coverage enhancement, or the like. In the present disclosure, the MTC terminal may refer to a terminal supporting low cost (or low complexity), a terminal supporting coverage enhancement, and the like. In addition, in the present disclosure, the MTC terminal may refer to a terminal classified into a specific category for supporting low cost (or low complexity) and/or coverage enhancement.

In other words, the MTC terminal may refer to a low cost (or low complexity) UE category/type newly defined in 3GPP Release-13 and performing LTE-based MTC-related operations. The MTC terminal may refer to a UE category/type defined in or before 3GPP Release-12, which supports enhanced coverage in comparison with the typical LTE coverage or supports low power consumption. Or, the MTC device may refer to a low cost (or low complexity) UE category/type newly defined in Release-13.

In the present disclosure, a wireless communication system is widely deployed to provide various communication services, such as a voice communication service, a packet data service, etc. The wireless communication system includes a user equipment (UE) and a base station (BS, eNB, gNB, or xNB). In the present disclosure, the UE is defined as a generic term referring to terminals used in wireless communication. For example, the UE may be referred to, but not limited to, a UE supporting wideband code division multiple access (WCDMA), long term evolution (LTE), high speed packet access (HSPA), or international mobile telecommunications (IMT)-2020 (5G or new radio), a mobile station (MS) supporting the global system for mobile communication (GSM), a user terminal (UT), a subscriber station (SS), a wireless device, or the like.

The base station or a cell generally refers to a station communicating with the UE. The base station or the cell is a generic term referring to, but not limited to, all of various communication service areas and devices, such as a Node-B, an evolved Node-B (eNB), a gNode-B (gNB), a low power node (LPN), a sector, a site, various types of antennas, a base transceiver system (BTS), an access point, a point (e.g., a transmitting point, a receiving point, or a transceiving point), a relay node, a megacell, a macrocell, a microcell, a picocell, a femtocell, a remote radio head (RRH), a radio unit (RU), and a small cell.

That is, in the present disclosure, the base station or the cell is defined as a generic term collectively including, as well as some communication service areas or functions covered by a base station controller (BSC) in CDMA, a Node-B in the WCDMA, an evolved Node-B (eNB) or a sector (site) in the LTE, and the like, all of various coverage areas, such as a megacell, a macrocell, a microcell, a picocell, a femtocell and a relay node, RRH, RU, a small cell communication range, or the like.

Each of the various cells is controlled by a base station. Therefore, the base station may be classified into two categories. The base station may be referred to 1) an apparatus that forms and provides a corresponding communication service area, such as a megacell, a macrocell, a microcell, a picocell, a femtocell, or a small cell, or 2) a communication service area. In the case of 1), the base station may be referred to 1) apparatuses that form and provide a communication service area and are controlled by the same entity or ii) apparatuses that interact and cooperate with each other for forming and providing the communication service area. According to communication schemes employed by a base station, the base station may be referred to as an eNB, a RRH, an antenna, a RU, a low power node (LPN), a point, a transmission/reception point, a transmission point, a reception point, or the like. In the case of 2), the base station may be a communication service area itself where UEs able to receive signals from or transmit signals to other UEs and neighboring base stations.

Accordingly, the base station is defined as a generic term collectively including the megacell, the macrocell, the microcell, the picocell, the femtocell, or the small cell, the RRH, the antenna, the RU, the LPN, the point, the eNB, the transmission/reception point, the transmission point, or the reception point.

In the present disclosure, the UE and the base station are two entities for performing transmission/reception used to embody the technology and technical spirit described in the present specification. The UE and the base station are defined as a generic term and not limited to specific terms or words. The UE and the base station are two entities for performing uplink or downlink transmission/reception used to embody the technology and technical spirit described in the present disclosure. The UE and the base station are defined as a generic term and not limited to specific terms or words. Herein, the uplink (UL) refers to data transmission/reception by a UE to/from a base station, and the downlink (DL) refers to data transmission/reception by a base station to/from a UE.

Any of multiple access techniques may be applied to the wireless communication system. For example, the wireless communication system may employ various multiple access techniques, such as code division multiple access (CDMA), time division multiple access (TDMA), frequency division multiple access (FDMA), orthogonal frequency division multiple access (OFDMA), OFDM-TDMA, OFDM-FDMA, OFDM-CDMA, or the like. Embodiments according to the present disclosure may be apply to resource allocation in i) asynchronous wireless communication evolving into LTE/LTE-advanced and IMT-2020 from GSM, WCDMA, and HSPA, ii) synchronous wireless communication evolving into CDMA, CDMA-2000, and UMB. The present disclosure is not construed to be limited to or limited to a particular wireless communication field and is construed as including all technical fields to which the spirit of the present disclosure may be applied.

UL transmission and DL transmission may be performed based on i) a time division duplex (TDD) technique performing transmission through different time slots or ii) a frequency division duplex (FDD) technique performing transmission through different frequencies.

Further, in some systems, such as the LTE or LTE-advanced, a related standard specification defines an UL and a DL to be established based on a single carrier or a pair of carriers. For transmitting/receiving control information, the UL and the DL may be configured with one or more control channels, such as a physical DL control channel (PDCCH), a physical control format indicator channel (PCFICH), a physical hybrid ARQ indicator channel (PITCH), a physical UP control channel (PUCCH), an enhanced physical DL control channel (EPDCCH), or the like. For transmitting/receiving data, the UL and the DL may be configured with one or more data channels, such as a physical DL shared channel (PDSCH), a physical UL shared channel (PUSCH), or the like.

Meanwhile, the control information may be transmitted through the EPDCCH (enhanced PDCCH or extended PDCCH).

In the present disclosure, the cell may refer to a coverage of a signal transmitted from a transmission point or a transmission/reception point, a component carrier having the coverage of the signal transmitted from the transmission point or the transmission/reception point, or the transmission/reception point itself.

A wireless communication system to which at least one embodiment is applied may be i) a coordinated multi-point transmission/reception system (CoMP system) in which two or more transmission/reception points cooperate to transmit a signal, ii) a coordinated multi-antenna transmission system, or iii) a coordinated multi-cell communication system. The CoMP system may include at least two multiple transmission/reception points and UEs.

The multiple transmission/reception points may be a base station (BS) or a macrocell (hereinafter, referred to as 'eNB') and at least one RRH that is connected to the eNB through an optical cable or an optical fiber, controlled in a wired manner, and has high transmission power or low transmission power in a macrocell area.

Hereinafter, the DL denotes communication or a communication path from multiple transmission/reception points to a UE, or the UL denotes communication or a communication path from the UE to the multiple transmission/reception points. In the DL, a transmitter may be a part of multiple transmission/reception points, and a receiver may be a part of the UE. In the UL, a transmitter may be a part of the UE, and a receiver may be a part of multiple transmission/reception points.

Hereinafter, transmission and reception of a signal through the PUCCH, the PUSCH, the PDCCH, the EPDCCH, or the PDSCH, may be described as the transmission and reception of the PUCCH, the PUSCH, the PDCCH, the EPDCCH, or the PDSCH.

In addition, a description of transmitting or receiving a PDCCH or a description of transmitting or receiving a signal through the PDCCH may be used as meaning including transmitting or receiving an EPDCCH/MPDCCH or transmitting or receiving a signal through the EPDCCH/MPDCCH.

That is, a physical DL control channel described below may mean the PDCCH or the EPDCCH, or is also used as meaning including both the PDCCH and the EPDCCH/MPDCCH.

Also, for convenience of description, the EPDCCH/MPDCCH may be applied to an embodiment including the PDCCH, as an embodiment of the present disclosure, and the PDCCH may be also applied to an embodiment including the EPDCCH/MPDCCH as an embodiment of the present disclosure.

Meanwhile, higher layer signaling described below includes radio resource control (RRC) signaling transmitting RRC information containing an RRC parameter.

The base station performs DL transmission to UEs. The base station may transmit a physical DL shared channel (PDSCH) which is a primary physical channel for unicast transmission, and a physical DL control channel (PDCCH) for transmitting i) DL control information such as scheduling required to receive the PDSCH and ii) scheduling approval information for transmission through an UL data channel (for example, a physical UL shared channel (PUSCH)). Hereinafter, transmitting/receiving a signal through each channel may be described in such a manner that a corresponding channel is transmitted/received.

5G New Radio (NR)

Recently, the 3GPP has approved the "Study on New Radio Access Technology", which is a study item for research on next-generation/5G radio access technology. On the basis of the Study on New Radio Access Technology, discussions have been in progress for frame structures, channel coding and modulation, waveforms, multiple access schemes, and the like for the NR.

It is required to design the NR only to provide improved data transmission rates compared with the long term evolution (LTE)/LTE-Advanced, but also to meet various requirements in detailed and specific usage scenarios. In particular, an enhanced mobile broadband (eMBB), massive machine-type communication (mMTC), and ultra reliable and low latency communication (URLLC) are proposed as representative usage scenarios of the NR. In order to meet the requirements of the individual scenarios, it is required to design the NR to have more flexible frame structures compared with the LTE/LTE-Advanced.

Specifically, the eMBB, mMTC, URLLC are considered as representative usage scenarios of the NR by the 3GPP. Each usage scenario imposes different requirements for data rates, latency, coverage, etc. Accordingly, there have been discussions for efficiently multiplexing a radio resource unit based on different numerologies (e.g., a subcarrier spacing (SCS), a subframe, a transmission time interval (TTI), etc.), as a method for satisfying requirements according to usage scenarios through a frequency band of an NR system.

To support requirements, there also have been discussions on i) a method of multiplexing at least one numerology each having different subcarrier spacing values from another over one NR carrier using TDM, FDM or TDM/FDM technique, and ii) a method of supporting one or more time units in configuring a scheduling unit in the time domain.

In this regard, in the NR, a subframe has been defined as one type of time domain structure. A single subframe duration having 14 OFDM symbols of 15 kHz sub-carrier spacing (SCS)-based normal CP overhead, like the LTE has been defined as a reference numerology for defining the subframe duration.

Therefore, the subframe of the NR has a time duration of 1 ms. However, unlike the LTE, since the subframe of the NR is an absolute reference time duration, a slot and a mini-slot may be defined as a time unit used for an actual UL/DL data scheduling.

In this case, the number of OFDM symbols forming a slot, a value of y, has been defined as y=14 regardless of the numerology.

Therefore, a slot may be formed of 14 symbols. In addition, according to transmission direction for the slot, all symbols may be used for DL transmission or UL transmission, or the symbols may be used in the configuration of a DL portion+a gap+ an UL portion.

Further, a mini-slot formed of fewer symbols than the typical slot has been defined in a numerology (or SCS). Therefore, a short time-domain scheduling interval for UL/DL data transmission/reception may be set based on the mini-slot. Also, a long time-domain scheduling interval for UL/DL data transmission/reception may be set using slot aggregation.

Particularly, as in the URLLC, in case latency critical data are transmitted/received, it may be difficult to satisfy a latency requirement when scheduling is performed based on a unit of a slot based on 1 ms defined in a frame structure based on a numerology having a small SCS value, for example, 15 kHz. To this end, it is possible to define a mini-slot formed of fewer orthogonal frequency division multiple symbols than the typical slot. Thus, it is possible to define the scheduling for the latency critical data, as in the URLLC, to be performed based on the mini-slot.

Further, methods have been discussed for scheduling data according to latency requirements based on the length of a slot (or a mini-slot) defined in each numerology, by multiplexing and supporting numerologies each having different SCS values from another in one NR carrier, using the TDM or FDM technique, as described above.

For example, since the length of a symbol for a SCS of 60 kHz as shown in FIG. 1 is shortened by about a fourth of that for the SCS of 15 kHz, when one slot is formed of seven OFDM symbols in both the cases, the length of the slot based on the SCS of 15 kHz is 0.5 ms, whereas the length of the slot based on the SCS of 60 kHz is shortened to about 0.125 ms.

As described above, methods of satisfying each requirement of URLLC and eMBB have been discussed by defining different SCSs or different TTI lengths in the NR.

Timing Relationship Between Control Information and Data

In the NR, as a method of determining HARQ ACK/NACK feedback timing for DL data reception of a UE, it is considered that the feedback timing is i) dynamically configured by L1 signaling (e.g. DL control information (DCI)), ii) semi-statically configured by higher layer, or iii) configured in combination of the higher layer and the dynamical L1 signaling.

In addition, as a method of determining timing between UL assignment and corresponding UL data transmission, it is also considered that the timing is i) dynamically configured by L1 signaling (e.g. DCI), ii) semi-statically configured by higher layer, or iii) configured in combination of the higher layer and the dynamical L1 signaling.

---

Agreements:
Timing relationship between DL data reception and corresponding acknowledgement can be (one or more of, FFS which ones)
dynamically indicated by L1 signaling (e.g., DCI)
semi-statically indicated to a UE via higher layer
a combination of indication by higher layers and dynamic L1 signaling (e.g., DCI)
FFS: minimum interval between DL data reception and corresponding acknowledgement
FFS: common channels (e.g. random access)
Agreements:
Timing relationship between UL assignment and corresponding UL data transmission can be (one or more of, FFS which ones)
dynamically indicated by L1 signaling (e.g., DCI)
semi-statically indicated to a UE via higher layer
a combination of indication by higher layers and dynamic L1 signaling (e.g., DCI)
FFS: minimum interval between UL assignment and corresponding UL data transmission
FFS: common channels (e.g. random access)

---

Furthermore, it may be considered that timing between DL assignment and corresponding DL data reception is i) dynamically configured by L1 signaling (e.g. DCI), ii) semi-statically configured by higher layer, or iii) configured in combination of the higher layer and the dynamical L1 signaling.

In accordance with embodiments of the present disclosure, a method is provided for configuring DL control information for supporting a method for multiplexing and transmitting/receiving URLLC data based on a short TTI length and eMBB data based on a long TTI length in a given frequency resource using the TDM technique.

In the typical LTE/LTE-A system, the allocation of an UL/DL data resource has been performed on a resource block (RB) basis in the frequency axis and on a subframe basis in the time axis.

Specifically, in the LTE/LTE-A system, for allocating a resource to a DL data channel (PDSCH), PDSCH transmission resource allocation information is transmitted by corresponding DL assignment DCI in the same subframe. UL grand DCI indicates PUSCH transmission resource allocation information of an UL subframe after 4 subframes.

Thus, in a DL subframe, a UE has performed reception operations for DL data through all OFDM symbols except for a control region for PDCCH transmission. In an UL subframe, the UE has transmitted UL data through all SC-FDMA symbols of the UL subframe, or all SC-FDMA symbols except for the last symbol in case a SRS is configured.

As described above, in the NR, a slot may be defined as a time domain scheduling unit (or TTI) in a frame structure based on a SCS value. Additionally, resource allocation to URLLC data sensitive to latency may be performed based on a unit of a mini-slot or a unit of a slot based on a larger SCS.

To this end, it is possible to configure separately, in the frequency band, a resource block (RB) of the NR for allocating a resource based on a unit of a short time domain scheduling unit (or TTI) such as a slot based on a larger SCS, or a mini-slot based on a smaller SCS and an RB of the NR for allocating a resource based on a unit of a long time domain scheduling unit (or TTI) such as a slot based on a smaller SCS.

Figure 2:
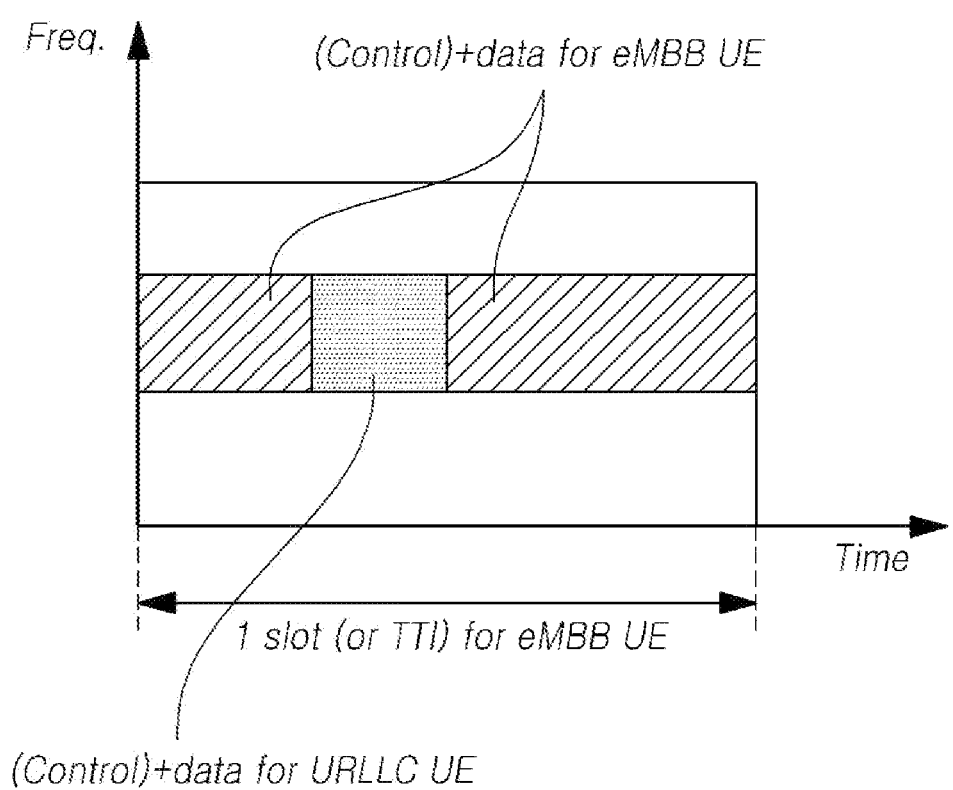
FIG. 2 is a diagram illustrating multiplexing based on the time division multiple (TDM) technique between the enhanced mobile broadband (eMBB) and the ultra-reliable and low latency communication (URLLC) in one slot.

However, as shown is FIG. 2, it is possible to perform multiplexing and transmitting/receiving each of URLLC data and eMBB data in each time domain scheduling unit (or TTI) using TDM technique in the same frequency band and RB. Accordingly, it is possible to increase the efficiency of resource use for multiplexing based on the FDM technique in the frequency axis.

In this case, it is necessary for resource allocation information on a symbol or a group of symbols basis to be indicated additionally in a scheduling unit for an NR UE on which a time domain scheduling unit (or TTI) having a longer time interval, such as the eMBB or the mMTC is defined.

Accordingly, in accordance with embodiments of the present disclosure, as a method of allocating a resource to UL/DL data channel (e.g., NR PDSCH or NR PUSCH) for a UE, i) allocation information of frequency resource (RB) and ii) OFDM symbol allocation information on a OFDM symbol or a group of symbols basis configuring a time domain scheduling unit (TTI) set for the UE may be included in DL control information for transmitting scheduling control information for the UL/DL data channel.

Hereinafter, according to Embodiments 1 and 2, basic concept will be discussed for allocating time-domain resource using OFDM symbol allocation information based on a unit of an OFDM symbol or a group of symbols configuring a time domain scheduling unit (TTI) set for a UE. Thereafter, methods of a UE and a base station will be discussed for allocating the time-domain resource.

Embodiment 1. Allocating on a Symbol Basis

As a method of configuring symbol allocation information on UL/DL data through a DL control information, it is possible to configure bitmap-based symbol allocation information for all symbols formed of a TTI set for a UE. Then the configured information may be included in UL/DL data allocation DL control information.

For example, for an NR UE on which a time domain scheduling unit (or TTI) is set as a unit of a slot formed of 14 symbols based on SCS 15 kHz, in configuring DL control information for transmitting UL/DL data scheduling control information for the NR UE, the control information may include a symbol allocation information area including a bitmap of 14 bits.

In this case, each bit forming bitmap configuration information of 14 bits is mapped to 1:1 on 14 symbols of the slot formed of the TTI, and according to the configuration information, a base station and the UE may additionally configure/obtain symbol allocation information to be used for data transmission/reception in a slot allocated for each UL/DL data transmission/reception.

As another method of configuring symbol allocation information on UL/DL data through DL control information, bitmaps for all symbols formed of a TTI set for a UE may be formed based on a unit of a group of symbols. Then the formed bitmap may be included in UL/DL data allocation DL control information.

At this time, a symbol size mapped to each bit forming the bitmap may be determined by a slot size based on i) a mini-slot defined for latency sensitive data such as URLLC in a TTI, or ii) a longer SCS.

For example, for an NR UE on which a TTI is set as a unit of a slot formed of 14 symbols based on 15 kHz, in case 6 mini-slots formed of (2 symbols, 2 symbols, 3 symbols, 2 symbols, 2 symbols, 3 symbols) is defined in one symbol to support a short TTI for latency sensitive data, such as URLLC, in a corresponding cell, in configuring DL control information for transmitting UL/DL data scheduling control information for the NR UE, for the control information may include a symbol allocation information area including a bitmap of 6 bits.

In this case, each bit forming bitmap configuration information of 6 bits is mapped to 1:1 on a group of symbols forming 3 mini-slots (e.g., the mini-slot formed of the 2 symbols or 3 symbols) defined in the slot, and according to the configuration information, a base station and the UE may additionally configure/obtain symbol allocation information to be used for data transmission/reception in a slot allocated for each UL/DL data transmission/reception.

In this case, the size of the group of symbols used as a unit of symbol allocation (e.g., the number of symbols forming one symbol group) and the number of symbol groups (a corresponding bitmap size) may be determined by i) the size of a TTI set for the UE and ii) the size of a short TTI formed in the TTI (the size of a mini-slot corresponding to the short TTI, e.g., 2 symbols or 3 symbols in the above example) and the number of the short TTIs (6 TTIs in the above example). In this regard, a predefined value may be defined according to a SCS value supported by the cell and a SCS value and a TTI size used in a corresponding UE, or the configuration may be performed by a base station through cell-specific/UE-specific high layer signaling.

As another method of configuring symbol allocation information on UL/DL data through DL control information, a symbol allocation candidate table may be formed for all symbols formed of a TTI set for a UE. Then, a base station may include and transmit symbol allocation index indication information based on the table on DL control information.

For example, for an NR UE on which a TTI is set based on a unit of a slot formed of 14 symbols based on 15 kHz, a symbol allocation candidate table may be formed as in the following Table 1.

TABLE 1

| Symbol allocation field in DCI | Allocated symbol indices for PDSCH(or PUSCH) |
|---|---|
| 000 | 0, 1, 2, 3, 4, 5, 6, 7, 8, 9, 10, 11, 12, 13 |
| 001 | 1, 2, 3, 4, 5, 6, 7, 8, 9, 10, 11, 12, 13 |
| 010 | 2, 3, 4, 5, 6, 7, 8, 9, 10, 11, 12, 13 |
| 011 | 3, 4, 5, 6, 7, 8, 9, 10, 11, 12, 13 |
| 100 | 0, 1, 2, 3, 4, 5, 6, 7, 8, 9, 10, 11, 12 |
| 101 | 1, 2, 3, 4, 5, 6, 7, 8, 9, 10, 11, 12 |
| 110 | 2, 3, 4, 5, 6, 7, 8, 9, 10, 11, 12 |
| 111 | 3, 4, 5, 6, 7, 8, 9, 10, 11, 12 |

It is possible to configure/obtain allocation information of a symbol to be used actually for UL/DL data transmission/reception for the UE among 14 symbols from #0 to #13 formed of a TTI defined for a UE.

It is noted that the symbol allocation table may be predefined with a SCS value or a TTI size supported by a corresponding cell, or be configured by a base station through cell-specific/UE-specific RRC signaling.

As another example, each of OFDM symbol (or SC-FDMA symbol) allocation information and indexes indicating the symbol allocation information for each UE may be included in a table form, as shown in Table 2. At this method, each of the OFDM symbol (or SC-FDMA symbol) allocation information may include respective starting OFDM symbols (or SC-FDMA symbols) and lengths. Hereinafter, an OFDM symbol may be used as a meaning including a SC-FDMA symbol.

TABLE 2

| OFDM symbol (or SC-FDMA symbol) allocation information | | |
|---|---|---|
| Index | Starting OFDM symbol | Length |
| 0 | 0 | 4 |
| 1 | 0 | 5 |
| 2 | 0 | 6 |
| 3 | 1 | 3 |
| 4 | 1 | 4 |
| 5 | 1 | 5 |
| 6 | 2 | 2 |
| 7 | 2 | 3 |
| 8 | 2 | 4 |
| 9 | 3 | 1 |
| 10 | 3 | 2 |
| 11 | 3 | 3 |
| 12 | 4 | 1 |
| 13 | 4 | 2 |
| 14 | 5 | 1 |
| 15 | reserved | reserved |

That symbol allocation candidate table includes OFDM symbol (or SC-FDMA symbol) allocation information and the related indexes for each UE, as shown in Table 2, means that a base station or a UE maps and stores OFDM symbol (or SC-FDMA symbol) allocation information on the indexes.

A symbol allocation candidate table may be formed for all symbols formed of a TTI set for a UE. For example, for an NR UE on which a TTI is set based on a unit of a slot formed of 14 symbols based on 15 kHz, as described above, a symbol allocation candidate table may be formed as shown in the Table 1 or 2. It is noted that the symbol allocation table may be predefined with a SCS value or a TTI size supported by a corresponding cell, or be configured by a base station through cell-specific/UE-specific RRC signaling.

For example, the base station may transmit the symbol allocation information in the form of a table for UL/DL data channel transmission/reception to the UE through UE-specific RRC signaling. The UE may receive the symbol allocation information in the form of a table for UL/DL data channel transmission/reception from the base station through UE-specific high layer signaling, such as RRC signaling.

Furthermore, in forming the symbol allocation table, a symbol allocation table for a DL data channel (e.g., a PDSCH) and a symbol allocation table for an UL data channel (e.g., a PUSCH) may be separately defined, or a base station may form the symbol allocation table and transmit the formed table to each UE through UE-specific high layer signaling, such as RRC signaling for each UE.

Thus, in case the symbol allocation table is formed as shown in the Table 1 or 2, as described above, a base station may include index indication information based on a PDSCH symbol allocation table formed for a UE in DL allocation DCI. Thus, the base station may indicate, to the UE, OFDM symbol resource allocation information for the PDSCH. Likewise, the base station may include index indication information based on a PUSCH symbol allocation table formed for the UE in UL grant DCI. The base station may indicate, to the UE, OFDM symbol resource allocation information for the PUSCH.

Embodiment 2. Configuration of Symbol-Level Allocation

Additionally, the symbol allocation described in the Embodiment 1 may be configured by a base station through cell-specific/UE-specific RRC signaling.

Thus, in case symbol-level allocation is configured through cell-specific/UE-specific RRC signaling (e.g., enabled), the symbol allocation information area may be included in DL allocation DL control information and/or UL allocation DL control information for an NR UE.

On the contrary, in case symbol-level allocation is not configured through cell-specific/UE-specific RRC signaling (e.g., disabled), the symbol allocation information area may not be included in DL allocation DL control information and/or UL allocation DL control information for an NR UE.

As another example, the symbol allocation described in the Embodiment 1 may be enabled or disabled implicitly according to a SCS value and a TTI length defined for a UE.

For example, for an NE UE operating based on a smaller SCS value than a specific threshold value, in case a TTI length set for the UE is larger than a predetermined value, the symbol allocation information area may be included in DL allocation DL control information and/or UL allocation DL control information for the UE.

On the contrary, in case an NE UE is operated based on a smaller SCS value than a specific threshold value and a TTI length set for the UE is smaller than a predetermined value, or an NE UE is operated based on a larger SCS value than the predetermined value, the symbol allocation information area may not be included in DL allocation DL control information and/or UL allocation DL control information for the UE.

Figure 3:
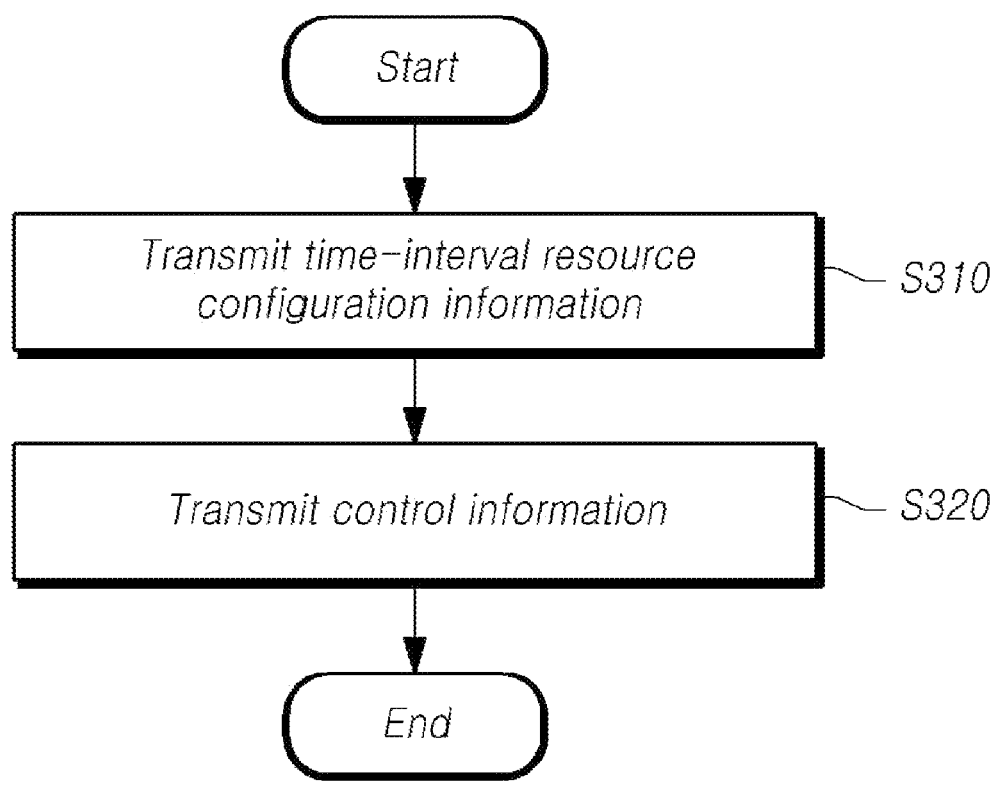
FIG. 3 is a flowchart illustrating a method of a base station for allocating a time-domain resource in order to transmit/receive a downlink (DL) data channel (PDSCH) or an uplink (UL) data channel (PUSCH) according to embodiments of the present disclosure.

FIG. 3 is a flowchart illustrating a method of a base station for allocating a time-domain resource for DL data channel (PDSCH) transmission/reception or UL data channel (PUSCH) transmission/reception according to embodiments of the present disclosure.

Referring to FIG. 3, a method 300 of a base station may be provided for allocating a time-domain resource for DL data channel (PDSCH) transmission/reception or UL data channel (PUSCH) transmission/reception in accordance with at least one embodiment. The method 300 includes allocating the time-domain resource based on a slot or a mini-slot as a unit of an OFDM symbol (or SC-FDMA symbol) and at the same time, transmitting, to a UE, time-domain resource configuration information including OFDM symbol (or SC-FDMA symbols) allocation information for OFDM symbols (or SC-FDMA symbols) used for data channel transmission/reception in the slot or the mini-slot, and transmitting, to the UE, control information selecting one of symbol allocation information included in the time-domain resource configuration information.

In order to allocate the time-domain resource for the DL data channel (PDSCH) transmission/reception, the time-domain resource configuration information may include, in the form of a table as shown in the Table 2, OFDM symbol allocation information and indexes indicating each of the symbol allocation information for each UE. The OFDM symbol allocation information for the DL data channel (PDSCH) transmission/reception may include one or more starting OFDM symbols and one or more lengths.

In this case, the time-domain resource configuration information includes the OFDM symbol allocation information and the indexes for each UE in the form of a table as shown in the Table 2. It means that a base station or a UE maps and stores the OFDM symbol allocation information on the indexes. Or, it also means that the OFDM symbol allocation information and the indexes are included in data and/or control information or a signal and then transmitted/received to/from other transmission/reception entities.

A symbol allocation candidate table may be formed for all symbols formed of a TTI set for a UE. For example, for an NR UE on which a TTI is set as a unit of a slot formed of 14 symbols based on 15 kHz, as described above, a symbol allocation candidate table may be formed as shown in the Table 1 or 2. It is noted that the symbol allocation table may be predefined with a SCS value or a TTI size supported by a corresponding cell, or be configured by a base station through cell-specific/UE-specific RRC signaling.

FIG. 4 is a diagram illustrating an information sequence of UE-specific higher layer signaling including time-domain resource configuration information in the form of a table for transmitting/receiving the DL data channel (PDSCH) as shown in FIG. 3.

In the step S310 of transmitting time-domain resource configuration information to a UE, a base station may transmit, to the UE, time-domain resource configuration information 400 in the form of a table for transmitting/receiving a DL data channel (PDSCH) through UE-specific high layer signaling, such RRC signaling. as shown in FIG. 4.

The base station may configure PDSCH time-domain resource configuration information in the form of a table as shown in the Table 1 or 2, and transmit the configured information to the UE through the RRC signaling. When configuring PDSCH time-domain resource configuration information in the form of a table as shown in the Table 1 or 2 and transmitting the configured information to the UE through the RRC signaling, the base station may include, in the PDSCH time-domain resource configuration information, i) information area (e.g., information area formed of 3 bits for indicating indexes 0 to 7 in the case of the Table 1, or formed of 4 bits for indicating indexes 0 to 15 in the case of the Table 2) for indicating each index forming the symbol allocation table and ii) OFDM symbol allocation information corresponding to each index, which is mapped to a specific value. Thus, the base station may transmit the PDSCH time-domain resource configuration information including the information area and the OFDM symbol allocation information mapped to the specific value to the UE through an RRC message (e.g., PDSCH time-domain resource configuration message).

As another example, the base station and the UE may predefine time-domain resource configuration information in the form of a table for PDSCH transmission as shown in the Table 1 or 2, and the base station may transmit table entry information to use for PDSCH symbol allocation for a UE to the UE through RRC signaling. For example, in case PDSCH time-domain resource configuration information in the form of a table as shown in the Table 2 is predefined in a base station and a UE, the base station may transmit entry-related information to use in the UE of the PDSCH time-domain resource configuration information through RRC signaling. That is, the base station may configure index information to use for PDSCH symbol allocation of the UE among indexes 0 to 15 of the Table 2 (e.g., an index value to use or index interval related information to use) and transmit the configured information to the UE through an RRC message (e.g., PDSCH time-domain resource configuration message).

In the step S320 of transmitting control information to the UE, the base station may transmit the control information including information indicating one of indexes.

Figure 5:
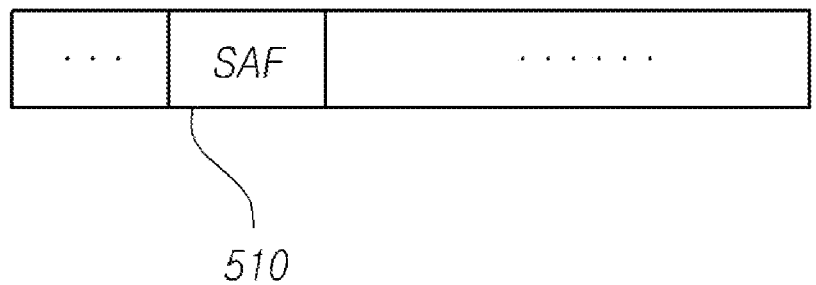
FIG. 5 is a diagram illustrating a part of a format of DL assignment DCI (DL control information) as in FIG. 3.

FIG. 5 is a diagram illustrating a part of a format of DL assignment DCI as shown in FIG. 3.

Referring to FIG. 5, control information may be DL allocation DL control information (DL allocation DCI) 500. In the step S320 of transmitting the control information to a UE, a base station may transmit the DL allocation DL control information 500 including information indicating one of indexes to the UE through a DL control channel (PDCCH).

Specifically, the DL allocation DL control information 500 illustrated in FIG. 5 may include a field representing information indicating one of indexes, such as a symbol allocation field (SAF) 510.

The SAF field 510 may represent one of indexes included in the time-domain resource configuration information 400 transmitted through the RRC signaling. For example, in case all of the time-domain resource configuration information of the Table 2 is transmitted through high layer signaling, the SAF field 410 may represent, with 4 bits, all of the OFDM symbol allocation information of the Table 2.

As another example, in case a part of the time-domain resource configuration information of the Table 2, such as indexes 0 to 7, is transmitted through high layer signaling, the SAF field 410 may represent the OFDM symbol allocation information with 3 bits.

In order to allocate the time-domain resource for UL data channel (PUSCH) transmission/reception, time-domain resource configuration information may include, in the form of a table, OFDM symbol (or SC-FDMA symbol) allocation information and indexes indicating each of the symbol allocation information for each UE. The OFDM symbol (or SC-FDMA symbol) allocation information for the UL data channel (PUSCH) transmission/reception may include one or more starting OFDM symbols (or SC-FDMA symbols) and one or more lengths.

In the step S310 of transmitting time-domain resource configuration information to the UE, the base station may transmit, to the UE, time-domain resource configuration information in the form of a table for the UL data channel (PUSCH) transmission/reception through UE-specific high layer signaling.

A symbol allocation candidate table may be formed for all symbols formed of a TTI set for the UE. For example, for an NR UE on which a TTI is set as a unit of a slot formed of 14 symbols based on 15 kHz, as described above, a symbol allocation candidate table may be formed as shown in the Table 2. It is noted that the symbol allocation table may be predefined with a SCS value or a TTI size supported by a corresponding cell, or be configured by a base station through cell-specific/UE-specific RRC signaling.

FIG. 6 shows an information sequence of UE-specific higher layer signaling including time-domain resource configuration information in the form of a table for UL data channel (PUSCH) transmission/reception as in FIG. 3.

In the step S310 of transmitting time-domain resource configuration information to a UE, a base station may transmit, to the UE, time-domain resource configuration information 600 in the form of a table for UL data channel (PUSCH) transmission/reception through UE-specific high layer signaling, such RRC signaling. as shown in FIG. 6.

As described above, the base station may configure PUSCH time-domain resource configuration information in the form of a table as shown in the Table 1 or 2, and transmit the configured information to the UE through the RRC signaling. When configuring PUSCH time-domain resource configuration information in the form of a table as shown in the Table 1 or 2 and transmitting the configured information to the UE through the RRC signaling, the base station may include, in the PUSCH time-domain resource configuration information, i) information area (e.g., information area formed of 3 bits for indicating indexes 0 to 7 in the case of the Table 1, or 4 bits for indicating indexes 0 to 15 in the case of the Table 2) for indicating each index forming the symbol allocation table and ii) OFDM symbol allocation information corresponding to each index, which is mapped to a specific value. Thus, the base station may transmit the PDSCH time-domain resource configuration information including the information area and the OFDM symbol allocation information mapped to the specific value to the UE through an RRC message (e.g., PUSCH time-domain resource configuration message).

As another example, the base station and the UE may predefine time-domain resource configuration information in the form of a table for PUSCH transmission as shown in the Table 1 or 2, and the base station may transmit table entry information to use for PUSCH symbol allocation for the UE to the UE through RRC signaling. For example, in case PUSCH time-domain resource configuration information in the form of a table as shown in the Table 2 is predefined in a base station and a UE, the base station may transmit entry-related information to use in the UE of the PUSCH time-domain resource configuration information through RRC signaling. That is, the base station may configure index information to use for PUSCH symbol allocation of the UE among indexes 0 to 15 of the Table 2 (e.g., an index value to use or index interval related information to use) and transmit the configured information to the UE through an RRC message (e.g., PUSCH time-domain resource configuration message).

In the step S320 of transmitting control information to the UE, the base station may transmit the control information including information indicating one of indexes.

Figure 7:
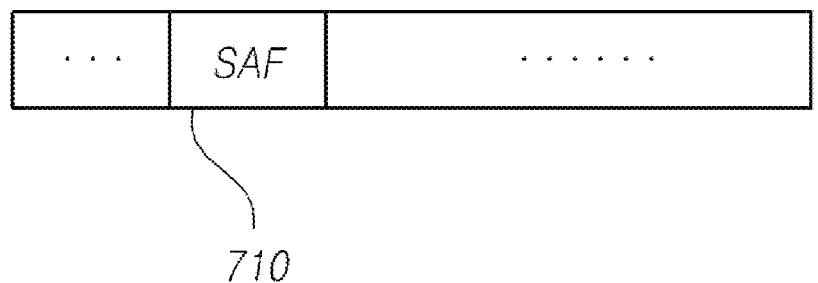
FIG. 7 is a diagram illustrating a part of a format of UL grant DCI (DL control information) as in FIG. 3.

FIG. 7 is a diagram illustrating a part of a format of UL grant DCI as in FIG. 3.

Referring to FIG. 7, control information may be UL grant DL control information (UL grant DCI) 700. In the step S320 of transmitting the control information to a UE, the base station may transmit the UL grant DL control information 700 including information indicating one of indexes to the UE through a DL control channel (PDCCH).

Specifically, the UL grant DL control information 700 illustrated in FIG. 7 may include a field representing information that indicates one of indexes, such as a symbol allocation field (SAF) 710.

The SAF field 710 may represent one of indexes in the time-domain resource configuration information 400 transmitted through the RRC signaling. For example, in case all of the time-domain resource configuration information of the Table 2 is transmitted through high layer signaling, the SAF field 710 may represent, with 4 bits, all of the OFDM symbol allocation information of the Table 2.

As another example, in case a part of the time-domain resource configuration information of the Table 2, such as indexes 0 to 7, is transmitted through high layer signaling, the SAF field 710 may represent the OFDM symbol allocation information with 3 bits.

Figure 8:
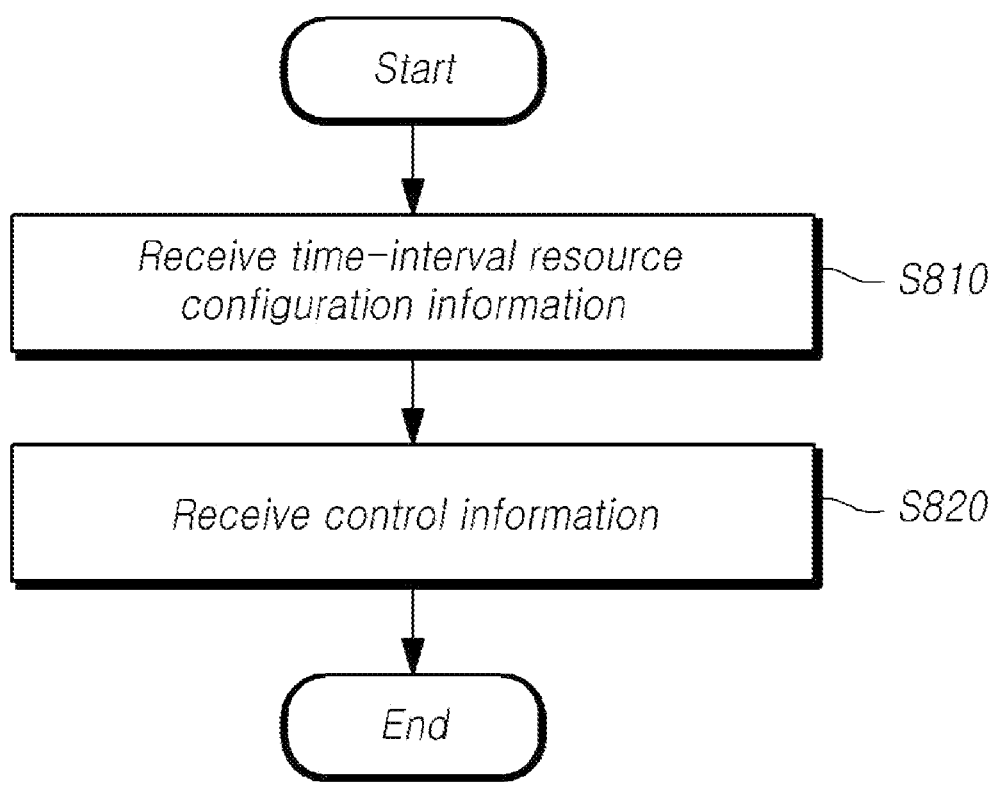
FIG. 8 is a flowchart illustrating a method of a base station for allocating a time-domain resource for downlink (DL) data channel (PDSCH) or uplink (UL) data channel (PUSCH) transmission/reception according to an embodiment of the present disclosure.

FIG. 8 is a flowchart illustrating a method of a base station for allocating a time-domain resource for DL data channel (PDSCH) or UL data channel (PUSCH) transmission/reception according to another embodiment of the present disclosure.

Referring to FIG. 8, a method 800 of a UE may be provided for allocating a time-domain resource for DL data channel (PDSCH) or UL data channel (PUSCH) transmission/reception in according to another embodiment. For example, the method 800 includes allocating the time-domain resource based on a slot or a mini-slot as a unit of an OFDM symbol and at the same time, receiving S810 time-domain resource configuration information including OFDM symbol allocation information for OFDM symbols used for data channel transmission/reception in the slot or the mini-slot, and receiving S820, from a base station, control information selecting one of symbol allocation information included in the time-domain resource configuration information.

In order to allocate the time-domain resource for the DL data channel (PDSCH) transmission/reception, the time-domain resource configuration information may include, in the form of a table, OFDM symbol allocation information and indexes indicating each of the symbol allocation information for each UE. The OFDM symbol allocation information for the DL data channel (PDSCH) transmission/reception may include starting one or more OFDM symbols and one or more lengths.

In the step S810 of receiving time-domain resource configuration information from the base station, the base station may transmit, to the UE, time-domain resource configuration information in the form of a table for the DL data channel (PDSCH) transmission/reception through UE-specific high layer signaling.

The UE may receive, from the base station, the time-domain resource configuration information 400 in the form of a table for the DL data channel (PDSCH) transmission/ reception through UE-specific high layer signaling, such RRC signaling, as shown in FIG. 4.

The UE may receive, from the base station, PDSCH time-domain resource configuration information in the form of a table as shown in the Table 1 or 2 through the RRC signaling. In case the UE receives PDSCH time-domain resource configuration information in the form of a table as shown in the Table 1 or 2 from a base station, the PDSCH time-domain resource configuration information may include information area (e.g., an information area formed of 3 bits for indicating indexes 0 to 7 in the case of the Table 1, or formed of 4 bits for indicating indexes 0 to 15 in the case of the Table 2) for indicating each index forming the table and also include OFDM symbol allocation information corresponding to each index, which is mapped to a specific value. Thus, the UE may receive the PDSCH time-domain resource configuration information including the information area and the OFDM symbol allocation information mapped to the specific value from the base station through an RRC message (e.g., PDSCH time-domain resource configuration message).

As another example, a base station and a UE may predefine time-domain resource configuration information in the form of a table for PDSCH transmission, as shown in the Table 1 or 2, and the UE may receive table entry-related information to use for PDSCH reception in the UE among the table formed time-domain resource configuration information from the base station through RRC signaling. For example, in case PDSCH time-domain resource configuration information in the form of a table as shown in the Table 2 is predefined in a base station and a UE, the UE may receive entry-related information to use in the UE among the PDSCH time-domain resource configuration information through RRC signaling. That is, index information to use for PUSCH symbol allocation information reception of the UE among indexes 0 to 15 of the Table 2 (e.g., an index value to use or index interval related information to use) may be set, and the UE may receive the configured information from the base station through an RRC message (e.g., PUSCH time-domain resource configuration message).

In the step S820 of receiving control information from the base station, the UE may receive the control information including information indicating one of indexes.

The control information may be DL allocation DL control information 500. In the step S820 of receiving the control information from the base station, the UE may receive the DL allocation DL control information 500 including information indicating one of indexes from the base station through a DL control channel (PDCCH).

Specifically, the DL allocation DL control information 500 shown in FIG. 5 may include a field representing information indicating one of indexes, such as a symbol allocation field (SAF) field 510.

The SAF field 510 may represent one of indexes included in the time-domain resource configuration information 400 transmitted through the high layer signaling.

In order to allocate the time-domain resource for UL data channel (PUSCH) transmission/reception, time-domain resource configuration information may include, in the form of a table, OFDM symbol (or SC-FDMA symbol) allocation information and indexes indicating each of the symbol allocation information for each UE. The OFDM symbol (or SC-FDMA symbol) allocation information for the UL data channel (PUSCH) transmission/reception may include one or more starting OFDM symbols (or SC-FDMA symbols) and one or more lengths.

In the step S810 of receiving time-domain resource configuration information from the base station, the base station may transmit, to the UE, time-domain resource configuration information 600 in the form of a table for the UL data channel (PUSCH) transmission/reception through UE-specific high layer signaling.

The UE may receive, from the base station, PUSCH time-domain resource configuration information in the form of a table as shown in the Table 1 or 2 through the RRC signaling. In case the UE receives PUSCH time-domain resource configuration information in the form of a table as shown in the Table 1 or 2 from a base station, the PUSCH time-domain resource configuration information may include information area (e.g., information area formed of 3 bits for indicating indexes 0 to 7 in the case of the Table 1, or formed of 4 bits for indicating indexes 0 to 15 in the case of the Table 2) for indicating each index forming the table and also include OFDM symbol allocation information corresponding to each index, which is mapped to a specific value. Thus, the UE may receive the PUSCH time-domain resource configuration information including the information area and the OFDM symbol allocation information mapped to the specific value from the base station through an RRC message (e.g., PUSCH time-domain resource configuration message).

As another example, a base station and a UE may pre-define time-domain resource configuration information in the form of a table for PUSCH transmission, as shown in the Table 1 or 2, and the UE may receive table entry-related information to use for PUSCH transmission in the UE among the table formed time-domain resource configuration information from the base station through RRC signaling. For example, in case PUSCH time-domain resource configuration information in the form of a table as shown in the Table 2 is predefined in a base station and a UE, the UE may receive entry-related information to use in the UE among the PUSCH time-domain resource configuration information through RRC signaling. That is, index information to use for PUSCH symbol allocation information reception of the UE among indexes 0 to 15 of the Table 2 (e.g., an index value to use or index interval related information to use) may be configured, and the UE may receive the configured information from the base station through an RRC message (e.g., PUSCH time-domain resource configuration message).

In the step S810 of receiving control information from the base station, the base station may transmit the control information including information indicating one of indexes to the UE.

The control information may be UL grant DL control information. In the step S810 of receiving the control information from the base station, the base station may transmit the UL grant DL control information including information indicating one of indexes to the UE through a DL Control channel.

Specifically, the UL grant DL control information 700 shown in FIG. 7 may include a field representing information indicating one of indexes, such as a symbol allocation field (SAF) 710. The SAF field 710 may represent one of indexes included in the time-domain resource configuration information transmitted through the high layer signaling.

Figure 9:
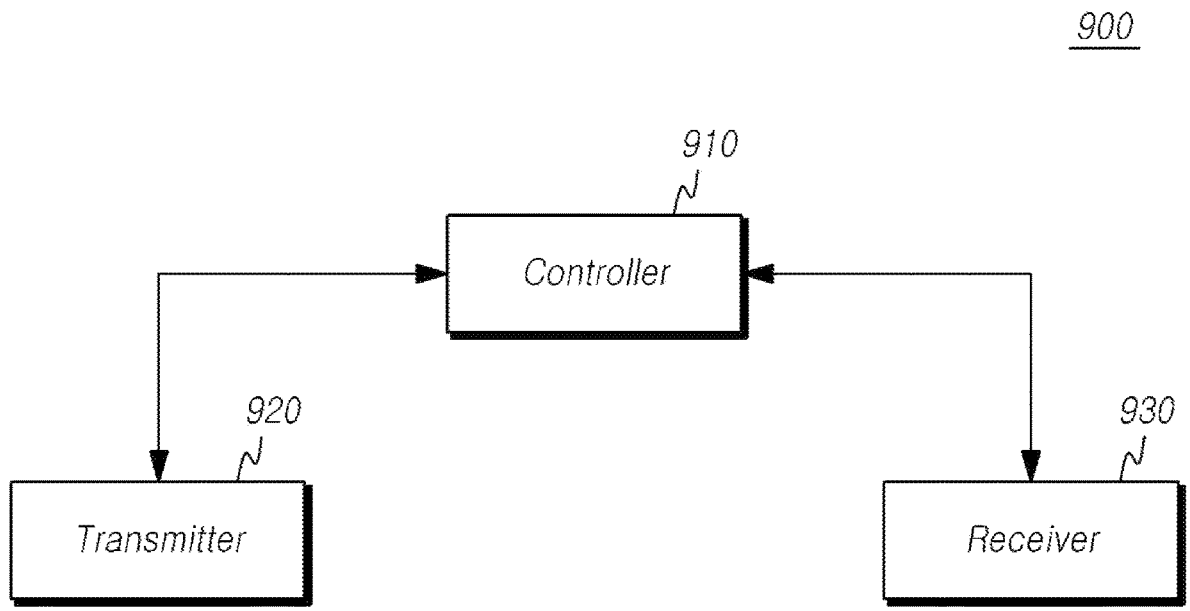
FIG. 9 is a block diagram illustrating a base station (BS) according to an embodiment of the present disclosure.

FIG. 9 is a block diagram illustrating a base station 900 according to embodiments of the present disclosure.

Referring to FIG. 9, a base station 900 according to another embodiment includes a controller 910, a transmitter 920, and a receiver 930.

The controller 910 is configured to control the overall operations of the base station for configuring symbol allocation information for allocating a data resource in the NR according to the embodiments of the present disclosure described above. The controller 910 is configured to control the overall operations of the base station 900 for allocating a time-domain resource for the DL data channel (PDSCH) or UL data channel (PUSCH) transmission/reception discussed referring to FIGS. 3 to 7.

The transmitter 920 and the receiver 930 respectively are configured to transmit and receive signals, messages, and data necessary for carrying out some embodiments as described above, to and from the UE.

That is, the transmitter 920 and the receiver 930 may be used to transmit/receive signals, messages, and the like required to perform a method of the base station for allocating the time-domain resource for the DL data channel (PDSCH) or UL data channel (PUSCH) transmission/reception discussed referring to FIGS. 3 to 7.

Figure 10:
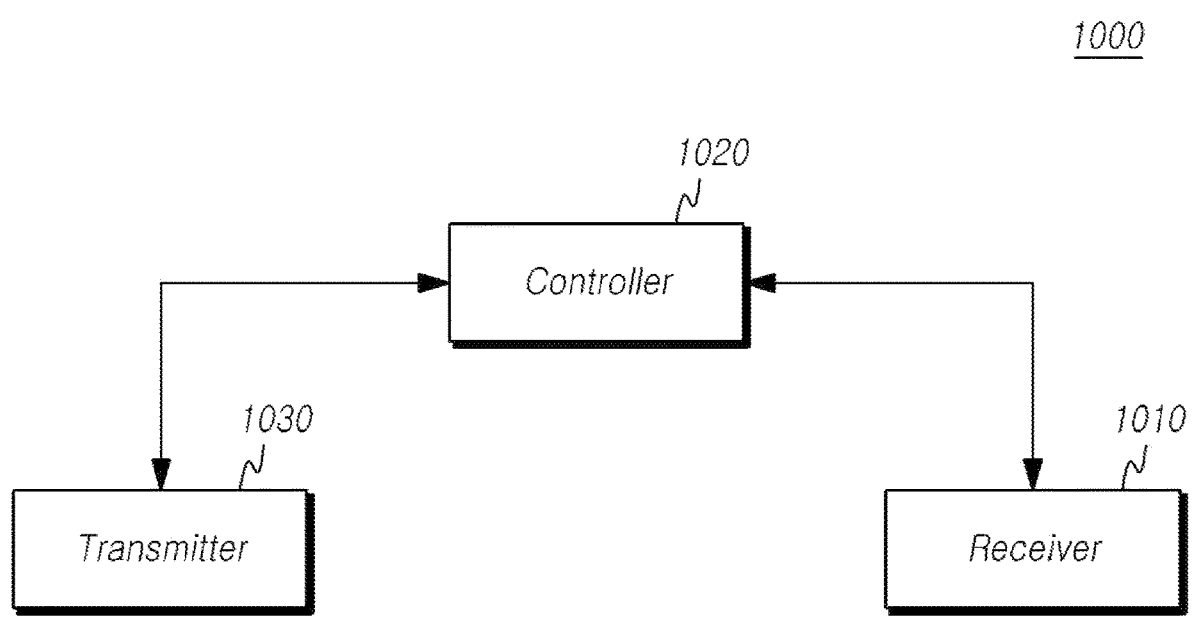
FIG. 10 is a block diagram illustrating a user equipment (UE) according to an embodiment of the present disclosure.

FIG. 10 is a block diagram illustrating a UE according to embodiments of the present disclosure.

Referring to FIG. 10, a UE 1000 according to another embodiment includes a receiver 1010, a controller 1020, and a transmitter 1030.

The receiver 1010 receives DL control information, data, and messages from a base station through a corresponding channel.

The controller 1020 is configured to control the overall operations of the UE 1000 for obtaining symbol allocation information of DL control information in the NR according to the embodiments of the present disclosure described above.

The controller 1010 is configured to control the overall operations of the UE 1000 for allocating a time-domain resource for the DL data channel (PDSCH) or UL data channel (PUSCH) transmission/reception discussed referring to FIGS. 3 to 7.

The transmitter 1030 is configured to transmit UL control information, data, and messages to a base station through a corresponding channel.

That is, the transmitter 1020 and the receiver 1030 may be used to transmit/receive signals, messages, and the like required to perform a method of the base station/UE for allocating the time-domain resource for the DL data channel (PDSCH) or UL data channel (PUSCH) transmission/reception discussed referring to FIGS. 3 to 7.

The standardized specifications or standard documents related to the embodiments described above constitute a part of the present disclosure. Accordingly, it should be construed that the incorporation of the content of the standardized specifications and part of the standard documents into the detailed description and claims is included within the scope of the present disclosure.

Although a preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes, but to describe the embodiments, the therefore, the scope of the present disclosure shall not be limited to such embodiments. The scope of protection of the present disclosure should be construed based on the following claims, and all technical ideas within the scope of equivalents thereof should be construed as being included within the scope of the present disclosure.

What is claimed is:

1. An operation method of a wireless device, the method comprising:
   receiving, by the wireless device, downlink control information (DCI) including time domain resource allocation information;
   receiving, by the wireless device, a physical downlink shared channel (PDSCH) or transmitting, by the wireless device, a physical uplink shared channel (PUSCH) based on a starting orthogonal frequency division multiplexing (OFDM) symbol and a number of OFDM symbols counting from the starting OFDM symbol in a slot, after receiving the DCI,
   wherein the time domain resource allocation information included in the DCI relates to row index information of an allocation table, and
   wherein the starting OFDM symbol and the number of OFDM symbols are identified based on the row index information of the allocation table.

2. The method of claim 1, wherein the time domain resource allocation information included in the DCI is represented by 3 bits.

3. The method of claim 1, wherein the DCI further includes frequency domain resource allocation information.

4. The method of claim 1, wherein the DCI is received through a physical downlink control channel (PDCCH).

5. The method of claim 1, further comprising:
   receiving, by the wireless device, a radio resource control (RRC) signaling in association with the time domain resource allocation information.

6. A wireless device, comprising:
   a transmitter;
   a receiver; and
   a controller which controls the transmitter and the receiver thereby performing operations including:
   receiving downlink control information (DCI) including time domain resource allocation information;
   receiving a physical downlink shared channel (PDSCH) or transmitting a physical uplink shared channel (PUSCH) based on a starting orthogonal frequency division multiplexing (OFDM) symbol and a number of OFDM symbols counting from the starting OFDM symbol in a slot, after receiving the DCI,
   wherein the time domain resource allocation information included in the DCI relates to row index information of an allocation table, and
   wherein the starting OFDM symbol and the number of OFDM symbols are identified based on the row index information of the allocation table.

7. The wireless device of claim 6, wherein the time domain resource allocation information included in the DCI is represented by 3 bits.

8. The wireless device of claim 6, wherein the DCI further includes frequency domain resource allocation information.

9. The wireless device of claim 6, wherein the DCI is received through a physical downlink control channel (PDCCH).

10. The wireless device of claim 6, wherein the operations further include:
    receiving a radio resource control (RRC) signaling in association with the time domain resource allocation information.

11. A base station, comprising:
    a transmitter;
    a receiver; and
    a controller which controls the transmitter and the receiver thereby performing operations including:
    transmitting downlink control information (DCI) including time domain resource allocation information; and
    transmitting a physical downlink shared channel (PDSCH) or receiving a physical uplink shared channel (PUSCH) based on a starting orthogonal frequency division multiplexing (OFDM) symbol and a number of OFDM symbols counting from the starting OFDM symbol in a slot, after transmitting the DCI,
    wherein the time domain resource allocation information included in the DCI relates to row index information of an allocation table, and
    wherein the starting OFDM symbol and the number of OFDM symbols are identified based on the row index information of the allocation table.

12. The base station of claim 11, wherein the time domain resource allocation information included in the DCI is represented by 3 bits.

13. The base station of claim 11, wherein the DCI further includes frequency domain resource allocation information.

14. The base station of claim 11, wherein the DCI is transmitted through a physical downlink control channel (PDCCH).

15. The base station of claim 11, wherein the operations further include:
    transmitting a radio resource control (RRC) signaling in association with the time domain resource allocation information.

16. An operation method of a base station, the method comprising:
    transmitting, by the base station, downlink control information (DCI) including time domain resource allocation information;
    transmitting, by the base station, a physical downlink shared channel (PDSCH) or receiving, by the base station, a physical uplink shared channel (PUSCH) based on a starting orthogonal frequency division multiplexing (OFDM) symbol and a number of OFDM symbols counting from the starting OFDM symbol in a slot, after transmitting the DCI,
    wherein the time domain resource allocation information included in the DCI relates to row index information of an allocation table, and
    wherein the starting OFDM symbol and the number of OFDM symbols are identified based on the row index information of the allocation table.

17. The method of claim 16, wherein the time domain resource allocation information included in the DCI is represented by 3 bits.

18. The method of claim 16, wherein the DCI further includes frequency domain resource allocation information.

19. The method of claim 16, wherein the DCI is transmitted through a physical downlink control channel (PDCCH).

20. The method of claim 16, further comprising:
    transmitting, by the base station, a radio resource control (RRC) signaling in association with the time domain resource allocation information.

* * * * *